United States Patent
Zusser et al.

(10) Patent No.: US 12,351,100 B2
(45) Date of Patent: Jul. 8, 2025

(54) MOTOR VEHICLE LIGHTING SYSTEM

(71) Applicant: ZKW Group GmbH, Wieselburg (AT)

(72) Inventors: Dominik Zusser, Ferschnitz (AT);
Heimo Frank, Wieselburg (AT);
Raphael Gutenbrunner, Blindenmarkt (AT)

(73) Assignee: ZKW Group GmbH, Wieselburg (AT)

( * ) Notice: Subject to any disclaimer, the term of this patent is extended or adjusted under 35 U.S.C. 154(b) by 72 days.

(21) Appl. No.: 18/214,868

(22) Filed: Jun. 27, 2023

(65) Prior Publication Data
US 2024/0017661 A1 Jan. 18, 2024

(30) Foreign Application Priority Data
Jul. 15, 2022 (EP) .................................. 22185213

(51) Int. Cl.
*B60Q 1/26* (2006.01)
*B60Q 1/14* (2006.01)
*G06V 20/58* (2022.01)

(52) U.S. Cl.
CPC ........... *B60Q 1/143* (2013.01); *G06V 20/582* (2022.01); *B60Q 2300/45* (2013.01)

(58) Field of Classification Search
CPC .............. B60Q 1/143; B60Q 2300/45; B60Q 2300/054; B60Q 2300/42; B60Q 2400/30; B60Q 1/0047; B60Q 1/085; B60Q 1/08; B60Q 1/14; G06V 20/582; B60R 1/22; H05B 45/325
USPC .................. 340/468, 425.5, 469, 472, 476
See application file for complete search history.

(56) References Cited

U.S. PATENT DOCUMENTS

| | | | | |
|---|---|---|---|---|
| 7,195,379 | B2 * | 3/2007 | Shaffer | B60Q 1/085 362/465 |
| 9,566,901 | B1 * | 2/2017 | Lindsay | H05B 47/115 |
| 2009/0190323 | A1 | 7/2009 | Watanabe et al. | |
| 2014/0071702 | A1 | 3/2014 | Faber et al. | |
| 2015/0353000 | A1 * | 12/2015 | Kowatzki | B60Q 1/247 315/77 |
| 2017/0008445 | A1 | 1/2017 | Roeckl et al. | |
| 2019/0202345 | A1 * | 7/2019 | Hennes | B60Q 1/1415 |

FOREIGN PATENT DOCUMENTS

| | | |
|---|---|---|
| DE | 102020126935 A1 | 4/2022 |
| WO | 0204247 A1 | 1/2002 |

* cited by examiner

*Primary Examiner* — Anh V La
(74) *Attorney, Agent, or Firm* — Eversheds Sutherland (US) LLP

(57) ABSTRACT

A motor vehicle lighting system (1) including at least two adaptive motor vehicle headlights (2), wherein an adaptive motor vehicle headlight (2) is a headlight that is designed to produce dipped beam distribution (AL) and adaptive full beam distribution (FL) having a resolution of at least two, preferably at least seven, individually controllable segments (FLs1, FLs2, Fls13), wherein the dipped beam distribution (AL) has a region assigned for the road sign lighting, hereinafter referred to as sign light region (ALsl), which at least partially overlaps with an emission region, which is associated with the full beam distribution (FL).

11 Claims, 5 Drawing Sheets

MOTOR VEHICLE LIGHTING SYSTEM

CROSS-REFERENCE TO RELATED APPLICATIONS

This application claims priority to European Patent Application No. 22185213.0, filed Jul. 15, 2022, which is incorporated herein by reference.

FIELD OF THE INVENTION AND DESCRIPTION OF PRIOR ART

The invention relates to a motor vehicle lighting system comprising at least two adaptive motor vehicle headlights, wherein an adaptive motor vehicle headlight is a headlight that is designed to produce dipped beam distribution and adaptive full beam distribution having a resolution of at least two, preferably at least seven, individually controllable segments, wherein the dipped beam distribution has a region assigned for the road sign lighting, hereinafter referred to as sign light region, which at least partially overlaps with an emission region, which is associated with the full beam distribution, at least one camera system for detecting the environment of the motor vehicle lighting system and for outputting environmental data corresponding thereto, by the camera system being designed to detect and determine the relative position of road users measured with respect to the at least two adaptive motor vehicle headlights, at least one control unit, which is connected to the camera system for receiving the environmental data and to the at least two adaptive motor vehicle headlights for controlling the adaptive motor vehicle headlights, wherein the control unit is designed to use the environmental data by comparing a detected relative position of a road user with a first position range, which can be illuminated by the segments of the adaptive full beam distribution, to infer the presence of a glare hazard and to define any detected road users in said illuminable position range as road users to be masked, and if there are road users to be masked, to deactivate in any case those controllable segments of the full beam distribution that would otherwise shine directly onto the road users to be masked.

Such glare-free adaptive lighting systems have become known from the prior art.

This makes it possible to reduce that part of the light emitted by the light module responsible for full beam distribution that would otherwise cause glare to the road user in question. The light distributions of adjacent segments typically at least partially overlap each other in order to enable homogeneous illumination and to uniformly illuminate transitions between the individual segments. This means that in practice, despite individual segments being switched off, a residual amount of light is often still emitted into the region to be masked by the full beam module.

In most European countries, legislation stipulates limit values for the emission of the individual light modules in various driving scenarios. The requirements concern the light emission of the individual light modules. Each light module is examined separately and has to meet the legal requirements.

Up to now, it has therefore sufficed to select the overlapping and light intensity of the illumination of the individual segments in such a way that the legally permitted amount of residual light is not exceeded. If light is emitted by other light modules that are responsible for other light functions such as sign light illumination or can illuminate this region, there is the risk that the actual amount of incident light in the region to be masked will nevertheless assume a relevant intensity.

SUMMARY OF THE INVENTION

One object of the invention is to further reduce the likelihood of potentially dazzling road users.

This object is achieved with a motor vehicle lighting system of the type mentioned in the introduction, whereby according to the invention, the control unit is further designed, if there is a road user to be masked, to carry out a comparison of its detected relative position with a second position range, which can be illuminated by the sign light region, and thus to infer the presence of road users to be masked within the second position range, wherein each adaptive motor vehicle headlight is further provided with a control means, wherein each control means is designed to control the intensity of the illumination of the sign light region by the respective adaptive motor vehicle headlight differently from the intensities of the remaining regions of the dipped beam distribution, wherein for this purpose the control unit is connected to the control means and the control means is controlled in such a way that in the case of the presence of a road user to be masked being detected within the second position range, the intensity of the light emitted into the sign light region is also reduced compared to a state where no road user to be masked is detected within the second position range.

In this way, the amount of light entering the sign light region is reduced if there is a risk of dazzling a road user. This makes it possible to offer solutions that also reliably meet legal standards such as the Federal Motor Vehicle Safety Standards 108 in the USA. Thanks to the invention, a lighting system can be created that takes into account the superimposition of the illumination of all light sources active in a vehicle. More precisely, for example in glare-free full beam mode, not only the illumination from the full beam module, but from all light modules contributing to the illumination of the glare-relevant area, in particular the so-called sign light region, which is intended for the illumination of traffic signs and signals, can be controlled.

The camera system can, for example, comprise an optical camera. The sign light region is, for example, also designated zone III in Regulation ECE_R149. It can also be described as a region that lies at least partially above the cut-off line of dipped beam distribution and is intended to illuminate road signs. The term "OHS" is also used for it in the American standard US FMVSS No 108 already mentioned. The segments are typically arranged in at least one horizontal row, but two or more rows can also be provided, wherein the segments are arranged next to one another in matrix-like manner, also above one another in the case of multi-row designs, and one row can have, for example, at least seven columns.

A horizontal resolution having at least 10 lighting segments can be useful, wherein this resolution can be achieved, for example, by superimposing the illumination of the individual segments of the left and right headlight. Therefore, a left and a right headlight can respectively have, for example, seven individual segments, which overlap mirror-asymmetrically and add up to 11 segments, for example. High-resolution systems can have a plurality of segments such that resolutions <0.1° (horizontal) are possible.

In particular, it can be provided that the reduction in the intensity of the light emitted into the sign light region compared to a state where no road user to be masked is detected within the sign light region is at least 30%. The reduction can, for example, be 50% or more.

It can further be provided that the control means is designed as a current controller of the light source responsible for the illumination of the sign light region.

In particular, it can be provided that the control means is designed in the form of PWM dimming, which is associated with the light source responsible for the illumination of the sign light region.

It can further be provided that the control means is designed as an adaptive light filter, the light transmission of which can be variably controlled, which is arranged, preferably exclusively, in the light path of the optical component provided for illuminating the sign light region. The control means can be designed to absorb the light passing through the adaptive light filter as a function of the environmental data.

In particular, it can be provided that at least one light source is provided per adaptive headlight, which is exclusively designed to illuminate the sign light region. This means that it is an independent module that is only responsible for illuminating sign light and otherwise does not contribute to the dipped beam. Such a module can also be called a "standalone" module.

The sign light can also be achieved by means of a bi-functional reflector concept, e.g. by means of a parabolic reflector, wherein the light source, in particular an LED source, for the dipped beam distribution (with the exception of the signal light part) lies in the focus of the reflector and an additional light source is provided away from the focus point especially for sign light and is positioned accordingly and can be controlled individually.

It can also be provided that the sign light illumination is segmented in itself and in turn only glare-relevant regions of the sign light illumination are deactivated. For this purpose, a segmented filter an/or an arrangement comprising two or more light sources can be provided, for example. It can also be provided that an additional light source, in particular an LED light source, is controlled by means of a matrix controller: Similar to before, except that certain light sources of a pixel light module are responsible for the sign light, and these are controlled individually in the usual way.

It can further be provided that an expansion of an existing module is provided via the sign light implementation in dipped beam mode via dimming individual segments and adapting this dimming in ADB mode. Furthermore, it can be provided to dim the whole module that has integrated the sign light illumination. For this purpose, a current control and/or PWM control and/or a filter can be provided.

It can further be provided that a signal light device is provided to illuminate the sign light region, wherein the signal light device is preferably a daytime running light module, a parking light module, a position light module, a side light module, an ambient light module and/or a design light module, wherein a control means is respectively associated with each signal light device.

Signal light device is understood to mean all light modules that are provided to increase the visibility for third parties by emitting light.

It can in particular be provided that a control means, in particular one control means each, is associated with all light sources and/or light modules of the motor vehicle lighting system provided to emit light and designed at least partly to illuminate the sign light region.

The invention further relates to a motor vehicle comprising a motor vehicle lighting system according to the invention.

BRIEF DESCRIPTION OF THE DRAWINGS

The invention is outlined in more detail below based on an exemplary and non-limiting embodiment, which is illustrated in the figures. In the figures

DETAILED DESCRIPTION OF EMBODIMENTS OF THE INVENTION

In the following figures, unless otherwise stated, the same reference numbers denote the same features.

Figure 1:
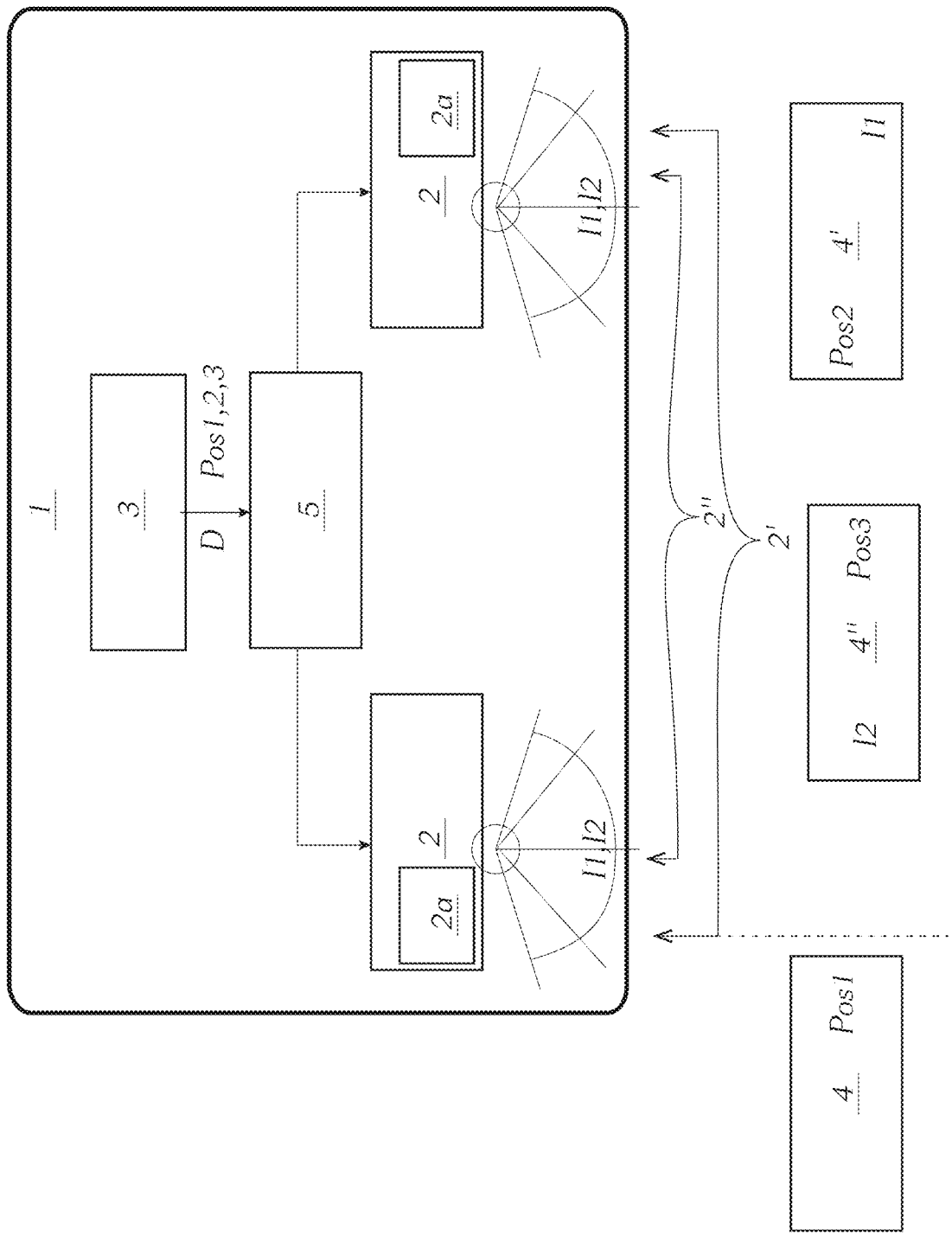
FIG. 1 shows a schematic illustration of a motor vehicle lighting system according to the invention.

FIG. 1 shows a schematic illustration of a motor vehicle lighting system 1 according to the invention. The motor vehicle lighting system 1 comprises at least two adaptive motor vehicle headlights 2. An adaptive motor vehicle headlight 2 is a headlight that is designed to produce dipped beam distribution AL (see FIG. 2) and adaptive full beam distribution FL (see FIG. 2) having a resolution of at least two, preferably at least seven, individually controllable segments FLs1, FLs2, Fls13 (see FIG. 4), wherein the dipped beam distribution AL has a region assigned for the road sign lighting, hereinafter referred to as sign light region Alsl (see FIG. 2), which at least partially overlaps with an emission region, which is associated with the full beam distribution FL.

Furthermore, the motor vehicle lighting system 1 has at least one camera system 3 for detecting the environment of the motor vehicle lighting system 1 and for outputting environmental data D corresponding thereto. The environmental detection occurs by the camera system 3 being designed to detect and determine the relative position Pos1, Pos2, Pos3 of road users 4', 4', 4'' measured with respect to the at least two adaptive motor vehicle headlights 2.

In addition, the motor vehicle lighting system 1 has at least one control unit 5, which is connected to the camera system 3 for receiving the environmental data D and to the at least two adaptive motor vehicle headlights 2 for controlling the adaptive motor vehicle headlights 2, wherein the control unit 5 is designed to use the environmental data D by comparing a detected relative position Pos of a road user 4 with a first position range 2', which can be illuminated by the segments FLs1, FLs2, Fls13 of the adaptive full beam distribution FL, to infer the presence of a glare hazard and to define any detected road users 4', 4" in said illuminable position range 2' as road users to be masked, and if there are road users 4 to be masked, to deactivate in any case those controllable segments FLs1, FLs2, Fls13 of the full beam distribution FL that would otherwise shine directly onto the road users 4 to be masked. In the example shown in FIG. 1, the road user 4 is outside of the first position range 2' in accordance with position Pos1 (e.g. far to the side of the light-emitting system 1) and therefore does not have to be masked—typically because the normal full beam distribution in this constellation causes no glare at all. Another road user 4', by contrast, is inside the first position range 2' in accordance with position Pos2 and must therefore be masked. A third road user 4" is also inside the first position range 2' in accordance with Pos3 and must therefore be masked.

The control unit 5 is further designed, if there is a road user 4', 4" to be masked, to carry out a comparison of the detected relative position Pos with a second position range 2", which can be illuminated by the sign light region ALsl, and thus to infer the presence of road users 4 to be masked within the second position range 2". Each adaptive motor vehicle headlight 2 is further provided with a control means 2a, wherein each control means 2a is designed to control the intensity of the illumination of the sign light region ALsl by the respective adaptive motor vehicle headlight 2 differently from the intensities of the remaining regions of the dipped beam distribution AL. For this purpose the control unit 5 is connected to the control means 2a and the control means 2a is controlled in such a way that in the case of the presence of a road user 4" to be masked being detected within the second position range 2", the intensity of the light emitted into the sign light region ALsl is also reduced compared to a state where no road user 4 to be masked is detected within the second position range 2", i.e. an otherwise provided light intensity I1 is reduced to a lower light intensity I2. The light intensities I1 and I2 describe an absolute light intensity, which results from superimposing the entire amount of light emitted by light sources into the sign light region. In the event of the described masking, this is reduced from I1 to I2. These variables are therefore only indirectly related to the light intensity of the full beam distribution FL and the dipped beam distribution AL.

The reduction in the intensity I2 of the light emitted into the sign light region ALsl compared to a state where no road user 4 to be masked is detected within the sign light region ALsl I1 is at least 30%, but can also be at least 50%, 80% or even 100%.

Figure 2:
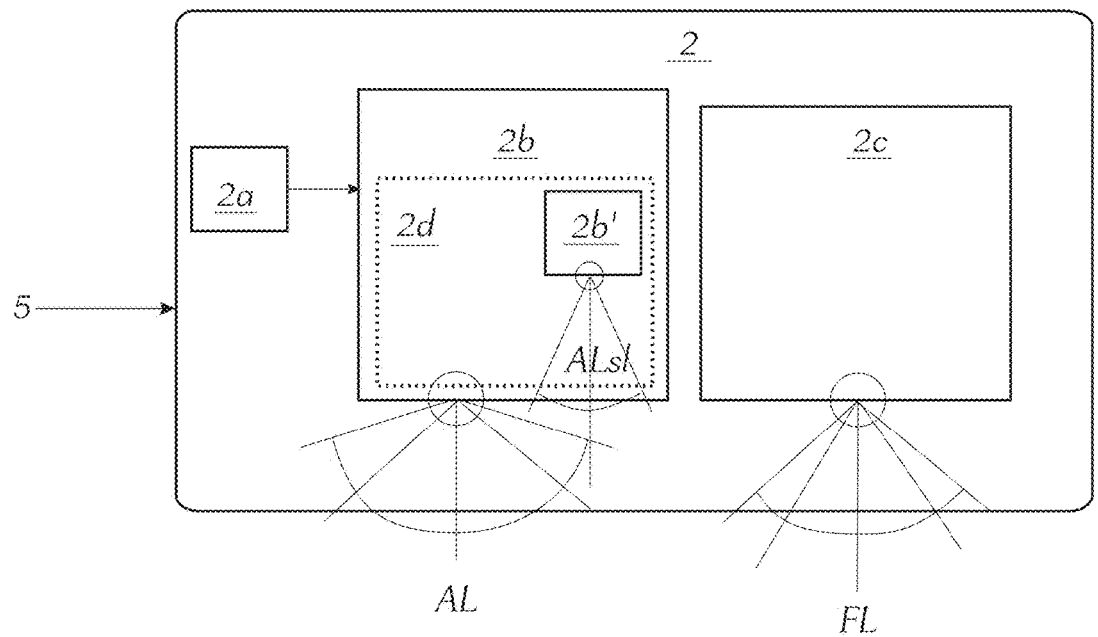
FIG. 2 shows a schematic illustration of an adaptive motor vehicle headlight.

FIG. 2 shows a schematic illustration of an adaptive motor vehicle headlight 2. This comprises a light module 2b, which is designed to emit the dipped beam distribution AL, which can additionally have a light source 2b, which is exclusively responsible for illuminating a sign light region ALsl. In addition, an additional light module 2c can be provided, which is provided exclusively for emitting the segmented full beam distribution FL, which is adaptive.

Figure 3:
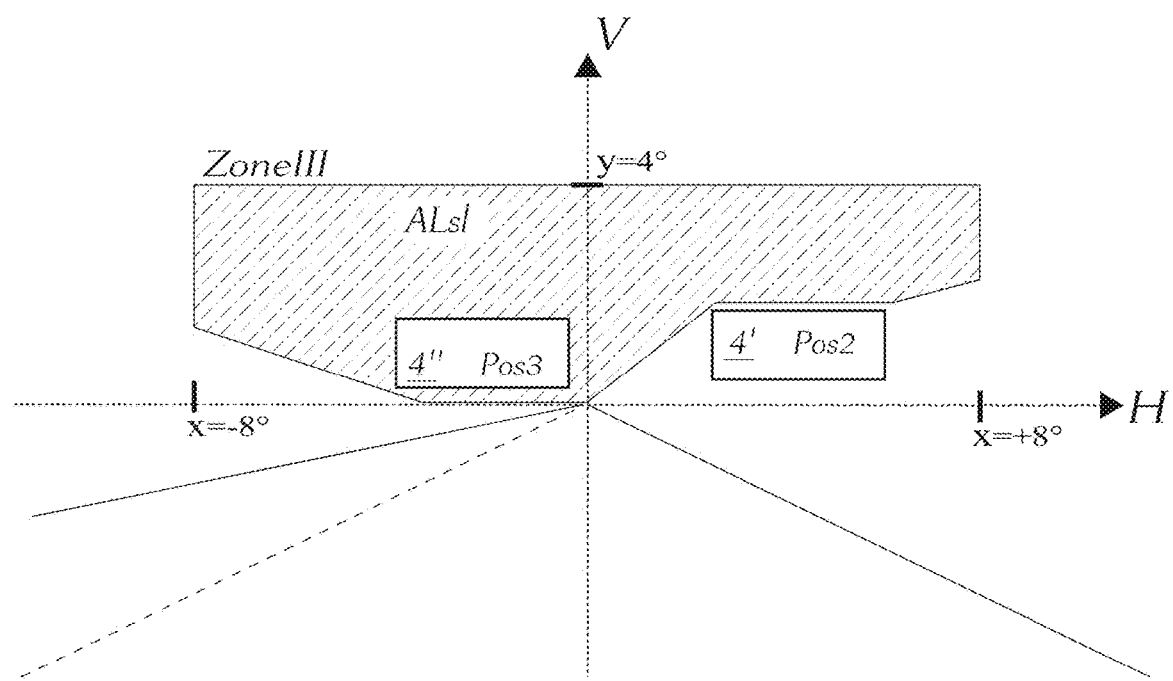
FIG. 3 shows a schematic illustration of light distribution for sign light in the vicinity of road users.

FIG. 3 shows a schematic illustration of light distribution for sign light in the vicinity of road users 4, namely of the road users 4' and 4" previously shown in FIG. 1. The sign light distribution typically extends over a predetermined angular range, wherein the value x is, for example, +/−8 degrees {8° left to 8° right} and the value y is, for example, 4 degrees {0°=horizon to 4° up}. It can be seen here that the road user 4" at Pos3 is within the signal light distribution, which is also called zone III and constitutes the second position range 2", and the road user 4' at Pos2 is conversely outside of the second position range 2".

Figure 4:
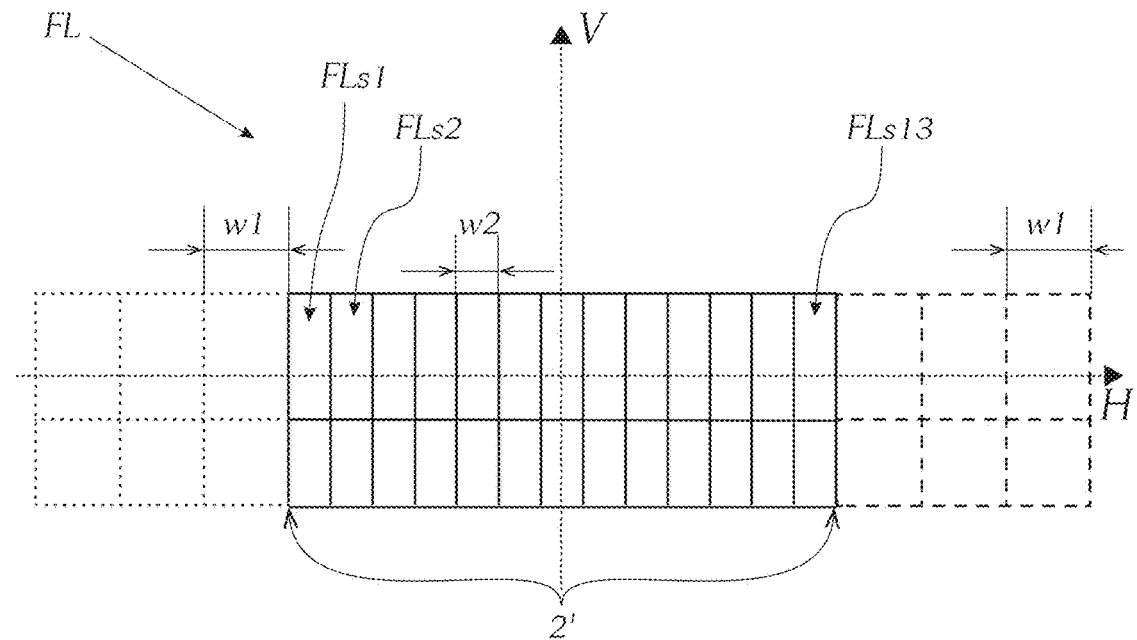
FIG. 4 shows a schematic illustration of individually controllable segments of adaptive full beam distribution.

FIG. 4 shows a schematic illustration of individually controllable segments FLs1, FLs2, Fls13 of adaptive full beam distribution FL. The segments have been shown by way of example and labelled. Their number, arrangement and size may vary depending on the application. They can also have different widths w1 and w2 both in the horizontal and vertical direction.

Figure 5:
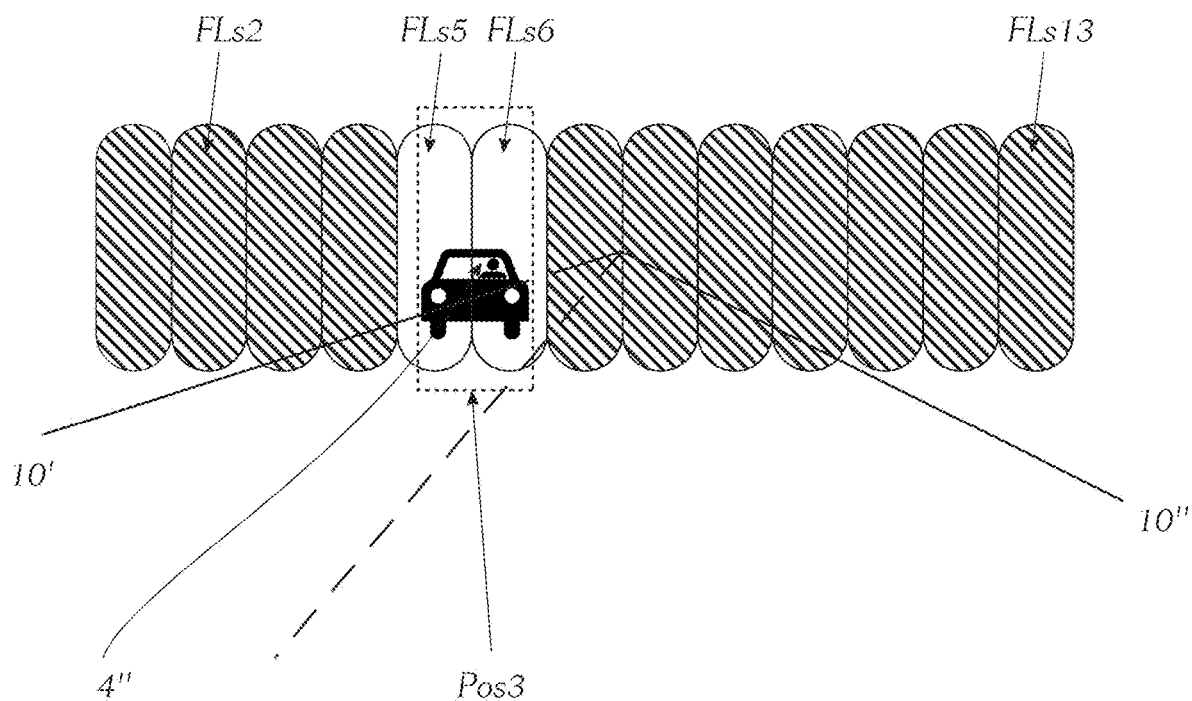
FIG. 5 shows a schematic illustration of adaptive full beam distribution with a masking scenario.

FIG. 5 schematically shows a masking scenario with the lanes 10' (left) and 10" (right), wherein the Pos3 of an oncoming road user 4" is masked by deactivating the lighting segments FLs5 and FLs6 and this road user 4" is not dazzled. This region in the traffic area is considered an "area of reduced intensity" (FIG. 6), within which the requirements on minimum and maximum luminous intensities of a dipped beam distribution, e.g. lower beam pattern" LB2V according to the Federal Motor Vehicle Safety Standards 108 in the USA, can be reliably complied with thanks to the invention.

Figure 6:
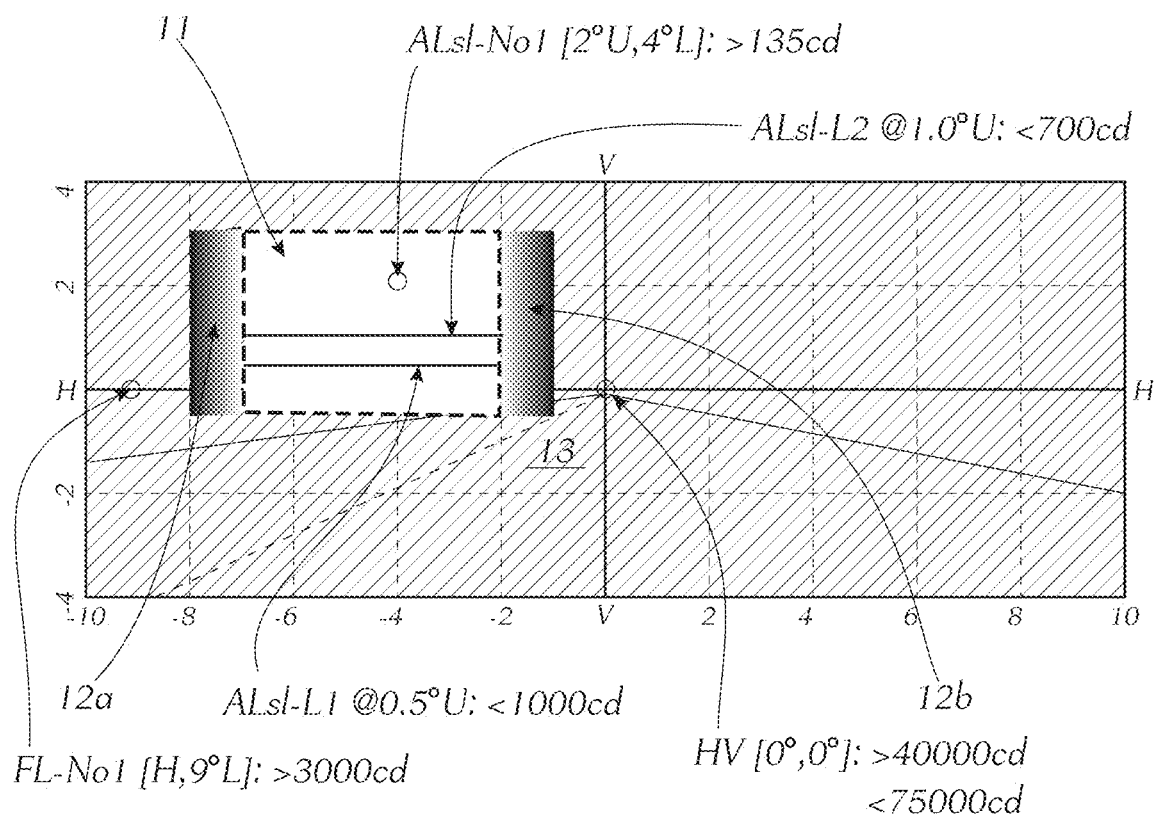
FIG. 6 shows a schematic illustration of those illumination areas of adaptive full beam distribution during a special traffic situation of an oncoming vehicle at 30 m distance

FIG. 6 describes for a certain driving situation (oncoming vehicle at 30 m distance) by way of example the "area of reduced intensity" 11 in a rectangle with the horizontal extension from 7.0° L to 2.0° L and the vertical extension from 0.4° D to 3.0° U. At the point of measurement ALsl-No1 [2° U,4° L], corresponding with S100LL in Zone III, there should be a minimum luminous intensity >135cd in this example; at the same time, along the horizontal measuring line ALsl-L1 at 0.5° U, a luminous intensity of no more than 1000 cd and along the horizontal measuring line ALsl-L2 at 1.0° U, a luminous intensity of no more than 700 cd should not be exceeded. Adjacent to this are "transition zones" 12a and 12b, which should respectively have an extension of ≤1.0° and in which the maximum luminous intensity should be 75000 cd. Outside of this zone is the "area of unreduced intensity" 13, in which the requirements for full beam distribution, e.g. "upper beam pattern" UB2 according to the Federal Motor Vehicle Safety Standards 108 in the USA, should be reliably complied with. For example, at the measuring point HV, luminous intensities >40000 cd and <75000 cd are prescribed; at the measuring point FL-No1 [H,9° L], this is more than 3000 cd. The overlapping areas of the sign light region ALsl and the area of reduced intensity must also be taken into account.

FIG. 2 also shows by way of example that at least one light source 2b' is provided per adaptive headlight 2, which is exclusively designed to illuminate the sign light region ALsl.

It can further be provided that a signal light device 2d is provided to illuminate the sign light region ALsl, wherein the signal light device is preferably a daytime running light module, a parking light module, a position light module, a side light module, an ambient light module and/or a design light module, wherein a control means 2a is respectively associated with each signal light device 2d.

It can in particular be provided that a control means 2a is associated with all light sources and/or light modules of the motor vehicle lighting system 1 provided to emit light and designed at least partly to illuminate the sign light region ALsl.

Figure 7A:
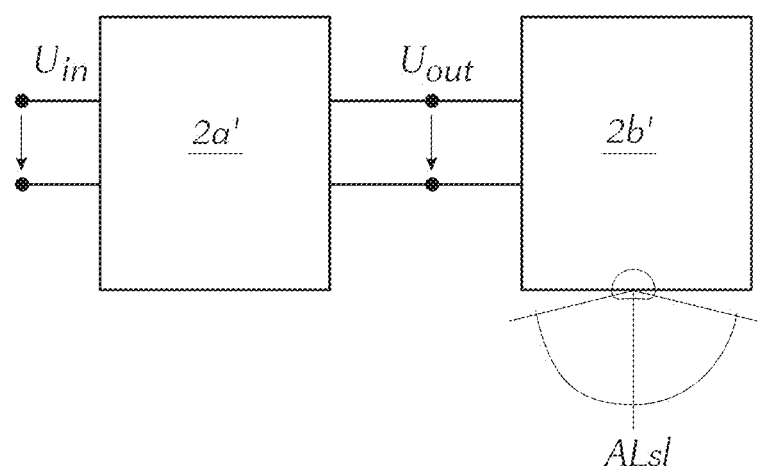
FIG. 7a shows a schematic illustration of a first type of control of the intensity of the sign light illumination.

FIG. 7a shows a schematic illustration of a first type of control of the intensity of the sign light illumination, wherein the control means 2a is designed as a current controller 2a' of the light source 2b' of the sign light headlight 2b responsible for the illumination of the sign light region ALsl. It can also be provided that the control means 2a is designed in the form of PWM dimming, which is associated with the light source 2b' responsible for the illumination of the sign light region ALsl.

Figure 7B:
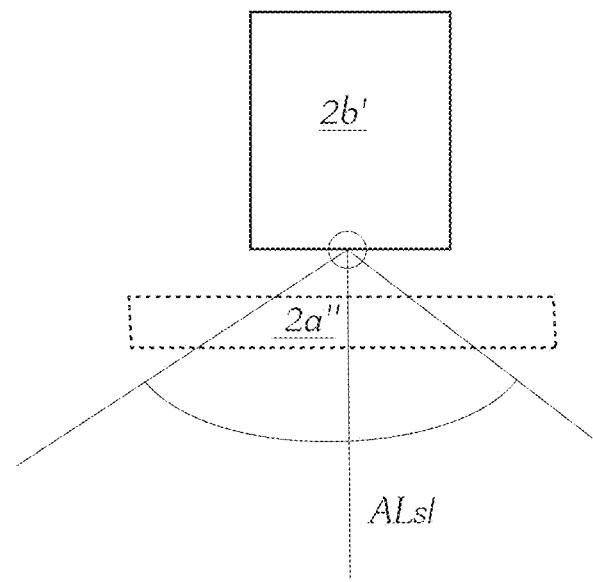
FIG. 7b shows a schematic illustration of a second type of control of the intensity of the sign light illumination.

FIG. 7b shows a schematic illustration of a second type of control of the intensity of the sign light illumination, wherein the control means 2a is designed as an adaptive light filter 2a'', the light transmission of which can be variably controlled, which is arranged, preferably exclusively, in the light path of the optical component 2b' provided for illuminating the sign light region ALsl.

Figure 8:
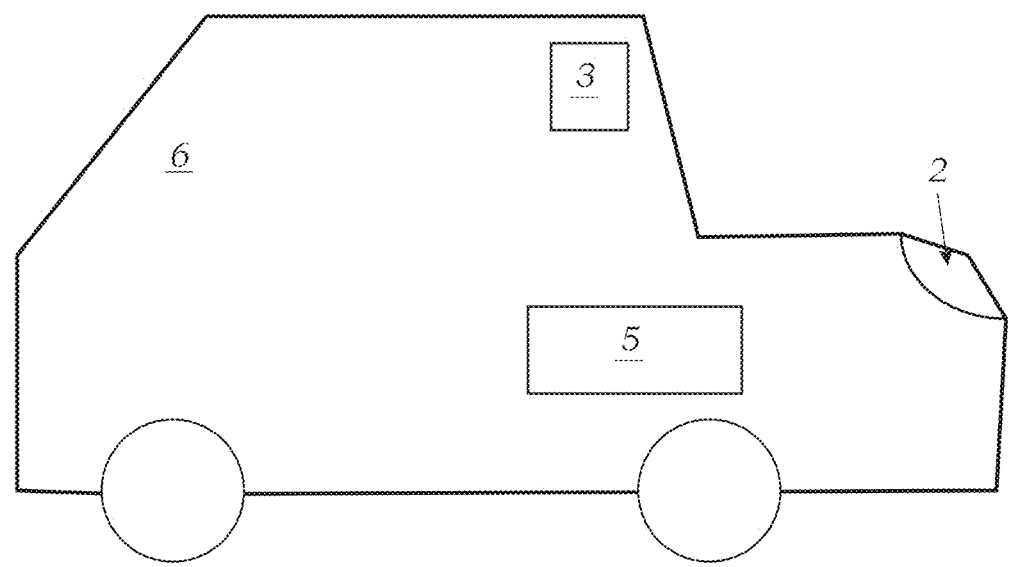
FIG. 8 shows a schematic illustration of a motor vehicle comprising a motor vehicle lighting system according to the invention.

FIG. 8 shows a schematic illustration of a motor vehicle 6 comprising a motor vehicle lighting system 1 according to the invention.

The invention is not limited to the embodiments shown, but is defined by the entire scope of protection of the claims. Individual aspects of the invention or embodiments may also be adopted and combined with each other. Any reference numbers in the claims are exemplary and merely serve to make the claims easier to read, without limiting them.

The invention claimed is:

1. A motor vehicle lighting system (1) comprising:
   at least two adaptive motor vehicle headlights (2), wherein an adaptive motor vehicle headlight (2) is a headlight that is designed to produce dipped beam distribution (AL) and adaptive full beam distribution (FL) having a resolution of at least two individually controllable segments (FLs1, FLs2, Fls13), wherein the dipped beam distribution (AL) has a region assigned for road sign lighting, hereinafter referred to as sign light region (ALsl), which at least partially overlaps with an emission region, which is associated with the full beam distribution (FL);
   at least one camera system (3) for detecting the environment of the motor vehicle lighting system (1) and for outputting environmental data (D) corresponding thereto, by the camera system (3) being designed to detect and determine the relative position (Pos1, Pos2, Pos3) of road users (4', 4', 4'') measured with respect to the at least two adaptive motor vehicle headlights (2); and
   at least one control unit (5), which is connected to the camera system (3) for receiving the environmental data (D) and to the at least two adaptive motor vehicle headlights (2) for controlling the adaptive motor vehicle headlights (2), wherein the control unit (5) is designed to use the environmental data (D) by comparing a detected relative position (Pos) of a road user (4) with a first position range (2'), which can be illuminated by the segments (FLs1, FLs2, Fls13) of the adaptive full beam distribution (FL), to infer the presence of a glare hazard and to define any detected road users (4', 4'') in said illuminable position range (2') as road users (4', 4'') to be masked, and if there are road users (4) to be masked, to deactivate in any case those controllable segments (FLs1, FLs2, Fls13) of the full beam distribution (FL) that would otherwise shine directly onto the road users (4) to be masked,
   wherein the control unit (5) is further designed, if there is a road user (4', 4'') to be masked, to carry out a comparison of its detected relative position (Pos) with a second position range (2''), which can be illuminated by the sign light region (ALsl), and thus to infer the presence of road users (4) to be masked within the second position range (2''), wherein each adaptive motor vehicle headlight (2) is further provided with a control means (2a), wherein each control means (2a) is designed to control the intensity of the illumination of the sign light region (ALsl) by the respective adaptive motor vehicle headlight (2) differently from the intensities of the remaining regions of the dipped beam distribution (AL), wherein for this purpose the control unit (5) is connected to the control means (2a) and the control means (2a) is controlled in such a way that in the case of the presence of a road user (4'') to be masked being detected within the second position range (2''), the intensity of light (I2) emitted into the sign light region (ALsl) is also reduced compared to a state where no road user (4) to be masked is detected (I1) within the second position range (2''), and
   wherein the reduction in the intensity (I2) of the light emitted into the sign light region (ALsl) compared to a state where no road user (4) to be masked is detected (I1) within the sign light region (ALsl) is at least 30%.

2. The motor vehicle lighting system (1) according to claim 1, wherein the control means (2a) is designed as a current controller (2a') of a light source (2b') responsible for the illumination of the sign light region (ALsl).

3. The motor vehicle lighting system (1) according to claim 1, wherein the control means (2a) is designed in the form of PWM dimming, which is associated with a light source (2b') responsible for the illumination of the sign light region (ALsl).

4. The motor vehicle lighting system (1) according to claim 1, wherein the control means (2a) is designed as an adaptive light filter (2a''), light transmission of which can be variably controlled, which is arranged in a light path of a light source (2b') provided for illuminating the sign light region (ALsl).

5. The motor vehicle lighting system (1) according to claim 1, wherein at least one light source (2b') is provided per adaptive headlight (2), which is exclusively designed to illuminate the sign light region (ALsl).

6. The motor vehicle lighting system (1) according to claim 1, wherein a signal light device (2d) is provided to illuminate the sign light region (ALsl) and a control means (2a) is respectively associated with each signal light device.

7. The motor vehicle lighting system (1) according to claim 1, wherein a control means (2a) is associated with all light sources and/or light modules of the motor vehicle lighting system (1) provided to emit light and designed at least partly to illuminate the sign light region (ALsl).

8. A motor vehicle (6), comprising the motor vehicle lighting system (1) according to claim 1.

9. The motor vehicle lighting system (1) according to claim 1, wherein the adaptive full beam distribution (FL) has a resolution of at least seven individually controllable segments.

10. The motor vehicle lighting system (1) according to claim 4, wherein the light transmission of the adaptive light filter is arranged exclusively in the light path of the optical component (2b').

11. The motor vehicle lighting system (1) according to claim 6, wherein the signal light device (2d) is a daytime running light module, a parking light module, a position light module, a side light module, an ambient light module and/or a design light module.

* * * * *